United States Patent
Frijlink et al.

(10) Patent No.: US 11,236,180 B2
(45) Date of Patent: Feb. 1, 2022

(54) PROCESS FOR PRODUCING HIGH MELT STRENGTH POLYPROPYLENE

(71) Applicant: AKZO NOBEL CHEMICALS INTERNATIONAL B.V., Arnhem (NL)

(72) Inventors: Wilhelm Klaas Frijlink, Zwolle (NL); Jan Martijn Van Der Schuur, Hengelo (NL); Auke Gerardus Talma, Bathmen (NL); Waldo Joseph Elisabeth Beek, Deventer (NL); Hendrikus Johannes Maria Kamp, Lochem (NL)

(73) Assignee: NOURYON CHEMICALS INTERNATIONAL B.V., Arnhem (NL)

( * ) Notice: Subject to any disclaimer, the term of this patent is extended or adjusted under 35 U.S.C. 154(b) by 0 days.

(21) Appl. No.: 16/640,784

(22) PCT Filed: Aug. 21, 2018

(86) PCT No.: PCT/EP2018/072468
§ 371 (c)(1),
(2) Date: Feb. 21, 2020

(87) PCT Pub. No.: WO2019/038244
PCT Pub. Date: Feb. 28, 2019

(65) Prior Publication Data
US 2020/0223956 A1    Jul. 16, 2020

(30) Foreign Application Priority Data
Aug. 24, 2017    (EP) ..................................... 17187648

(51) Int. Cl.
*C08F 8/48*    (2006.01)
*C08K 5/134*    (2006.01)

(52) U.S. Cl.
CPC ................ *C08F 8/48* (2013.01); *C08K 5/134* (2013.01)

(58) Field of Classification Search
CPC ............. C08K 5/14; C08K 5/134; C08F 8/48; C08L 23/10
USPC ......................................................... 524/291
See application file for complete search history.

(56) References Cited

U.S. PATENT DOCUMENTS 6,951,904 B1 *  10/2005  Peeters .................... C08K 5/14
                                                    525/265

FOREIGN PATENT DOCUMENTS

| EP | 0384331 A | 8/1990 |
| WO | 9927007 A1 | 6/1999 |
| WO | WO 99/27007 * | 6/1999 |
| WO | 2016126429 A1 | 8/2016 |

OTHER PUBLICATIONS

EPO, European Extended Search Report issued in European Application No. 17187648.5, dated Feb. 9, 2018.
EPO, International Search Report and Written Opinion issued in International Application No. PCT/EP2018/072468, dated Aug. 21, 2018.

* cited by examiner

*Primary Examiner* — William K Cheung
(74) *Attorney, Agent, or Firm* — Lorenz & Kopf, LLP

(57) ABSTRACT

A process for enhancing the melt strength of polypropylene by extruding said polypropylene in a twin-screw extruder, under inert atmosphere, at a temperature between about 150° C. and about 300° C., and in the presence of about 0.1 to about 3.0 wt %, based on the weight of the polypropylene, of a para-substituted dibenzoyl peroxide.

20 Claims, No Drawings

PROCESS FOR PRODUCING HIGH MELT STRENGTH POLYPROPYLENE

CROSS-REFERENCE TO RELATED APPLICATION

This application is a U.S. National-Stage entry under 35 U.S.C. § 371 based on International Application No. PCT/EP2018/072468, filed Aug. 21, 2018, which was published under PCT Article 21(2) and which claims priority to European Application No. 17187648.5, filed Aug. 24, 2017, which are all hereby incorporated in their entirety by reference.

TECHNICAL FIELD

The technical field relates to a process for producing high melt strength polypropylene (HMS-PP).

BACKGROUND

Processes for improving the melt strength of polypropylene using a peroxide are known in the art. The treatment with peroxide creates long chain branches. The more long chain branches, the higher the melt strength.

For instance, WO 99/027007 discloses a process which involves thermal treatment of polypropylene with a peroxydicarbonate. Several peroxydicarbonates are disclosed in this document, including dicetyl peroxydicarbonate, dimyristyl peroxydicarbonate, and di(4-tert-butylcyclohexyl) peroxydicarbonate.

The advantages of these particular dialkyl peroxydicarbonates are, apart from their good performance in the process, their safety aspects and ease of handling. All of them are in solid form and—in contrast to many other peroxydicarbonates—can be safely stored and handled at room temperature. In addition, they can be used in an extrusion process.

High melt strength polypropylene (HMS-PP) finds use in food packaging and automotive applications. At higher temperatures, the decomposition product of the dialkyl peroxydicarbonate—i.e. alcohols such as cetyl alcohol, myristyl alcohol, and 4-tert-butylcyclohexanol—tend to evaporate from the HMS-PP and condense on other surfaces, thereby forming a fogged surface with reduced visual transparency. This phenomenon is called fogging.

For example, as a result of heating an HMS-PP based food package in a microwave, the alcoholic decomposition product may evaporate and condense on the package's lid or the microwave window, thereby negatively affecting their transparency.

HMS-PP used in automotive interiors may heat up at warm weather conditions and the alcoholic decomposition product may condense on the car windows, with the evidently undesired result of reduced visibility.

The decomposition products of dicetyl and dimyristyl peroxydicarbonates also tend to migrate to the surface of the modified polypropylene. This phenomenon is called "blooming" and leads to the formation of white or glittering particles on the surface, resulting in a non-uniform appearance of the polymer surface.

Accordingly, it is desirable provide a process that for producing polypropylene with high melt strength and high branching numbers (Bn) using a peroxide that does not release fatty alcohols as a decomposition product. It also is desirable to provide a process that improves melt strength and/or long chain branching, without significant degradation of the polypropylene. Furthermore, other desirable features and characteristics will become apparent from the subsequent detailed description and the appended claims, taken in conjunction with the accompanying drawings and the foregoing technical field and background.

BRIEF SUMMARY

In accordance with an embodiment, a process for enhancing the melt strength of polypropylene is provided. The process includes extruding a polypropylene in a twin-screw extruder, under inert atmosphere, at a temperature in the range of from about 150° C. to about 300° C., and in the presence of about 0.1 to about 3.0 wt %, based on the weight of the polypropylene, an organic peroxide with the formula

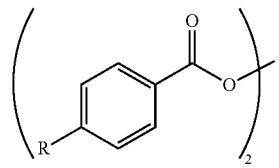

wherein each R is individually selected from $C_{1-5}$ alkyl groups.

In accordance with an embodiment, a process for enhancing the melt strength of polypropylene is provided. The process includes extruding a polypropylene in a twin-screw extruder, under inert atmosphere, at a temperature in the range of from about 160° C. to about 240° C., and in the presence of about 0.5 to about 2.0 wt %, based on the weight of the polypropylene, di(4-methylbenzoyl)peroxide.

DETAILED DESCRIPTION

As used herein, the word exemplary means serving as an example, instance, or illustration. The following detailed description is merely exemplary in nature and is not intended to limit the invention or the application and uses of the invention. Any embodiment described herein as exemplary is not necessarily to be construed as preferred or advantageous over other embodiments. The embodiments described in this Detailed Description are exemplary embodiments provided to enable persons skilled in the art to make or use the invention and not to limit the scope. Furthermore, there is no intention to be bound by any expressed or implied theory presented in this document.

The use of numerical values in the various ranges specified in this application, unless expressly indicated otherwise, are stated as approximations as though the minimum and maximum values within the stated ranges were both preceded by the word "about". Thus, slight variations above and below the stated ranges can be used to achieve substantially the same results as values within the ranges. Moreover, in the disclosure of these ranges, a continuous range is intended, covering every value between the minimum and maximum values, including the minimum and maximum end points of the range. In general, the term "about" means+/−10% from the stated value.

In accordance with an exemplary embodiment, a process includes extruding the polypropylene in a twin-screw extruder, under inert atmosphere, using an organic peroxide of the formula

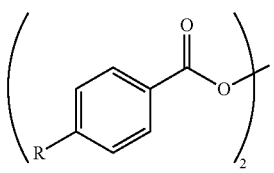

wherein each R is located at the para-position of the aromatic ring and is individually selected from $C_{1-5}$ alkyl groups.

In an exemplary embodiment, each R is individually selected from $C_{1-5}$ alkyl groups. Examples of such groups are methyl, ethyl, n-propyl, i-propyl, n-butyl, sec-butyl, tert-butyl, and tert-amyl. In another exemplary embodiment, each R is methyl.

In a further exemplary embodiment, the organic peroxide is di(4-methylbenzoyl)peroxide.

It has been found that the use of these peroxides results in higher melt strengths than the use of, e.g., dicetyl peroxydicarbonate, dibenzoylperoxide, and ortho-substituted dibenzoyl peroxide.

This is surprising considering the fact that U.S. Pat. No. 6,951,904 found the opposite effect: with 1.0 wt % dibenzoyl peroxide, a higher melt strength was achieved than with 1.0 wt % di(4-methylbenzoyl)peroxide (para-toluyl peroxide).

The experiments in U.S. Pat. No. 6,951,904 were conducted in the presence of air. It has now been found that, under inert atmosphere, the opposite result is achieved.

In addition to the peroxide mentioned above, small amounts of unsubstituted dibenzoyl peroxides or asymmetrically substituted dibenzoyl peroxides may be present.

In an exemplary embodiment, a process is provided for enhancing the melt strength of polypropylene by extruding said polypropylene in a twin-screw extruder, under inert atmosphere, at a temperature between about 150° C. and about 300° C., and in the presence of about 0.1 to about 3.0 wt %, based on the weight of the polypropylene, of an organic peroxide as defined above.

The polypropylene can be a homopolymer of propylene or a random, alternating, heterophasic, or block co- or terpolymer of propylene and other olefins. Generally, a propylene copolymer or terpolymer will contain one or more other olefins, such as ethylene, butene, pentene, hexene, heptene, or octene, but it may also comprise styrene or styrene derivatives. In an embodiment, the content of olefins other than propylene is not more than about 30 wt % of all monomers.

Polypropylene homopolymers and copolymers of propylene and ethylene are most preferred. It is also possible to use mixtures of polypropylene and polyethylene.

The melting point of commercially available propylene homopolymer is about 160 to about 170° C. The melting point of propylene copolymers and terpolymers is generally lower.

The molecular weight of the polypropylene contemplated herein can be selected from a wide range. Indicative of the molecular weight is the melt flow index (MFI). Use may be made of a polypropylene having an MFI from about 0.1 to about 1000 g/10 min (230° C., 21.6 N). In an embodiment, use is made of a polypropylene having an MFI from about 0.5 to about 250 g/10 min.

The polypropylene may be a branched polypropylene, such as described in WO 2016/126429 and WO 2016/126430.

In an embodiment, the extrusion is performed at a temperature in the range of about 150 to about 300° C., for example, about 155 to about 250° C., such as about 160 to about 240° C.

Extrusion is conducted under inert atmosphere, which means that it is conducted in an atmosphere of inert gas, such as nitrogen, carbon dioxide, or argon. In an embodiment, nitrogen is used. In an exemplary embodiment, the oxygen concentration in the inert atmosphere is below about 1 vol %, for example, below about 0.5 vol %, such as below about 0.1 vol %.

Extrusion allows modification of the polypropylene to be combined with pelletization. In an exemplary embodiment, use is made of a twin-screw extruder. Single screw extruders are less suitable because they are unable to adequately homogenize the peroxide within the polypropylene. The residence time in the extruder is generally about 10 seconds to about 5 minutes.

The screw speed of the extruder is in the range of about 25 to about 500 rpm, in an embodiment. The temperature of the extruder should be above the melting temperature of the polypropylene.

The process contemplated herein can be carried out as a batch process, a continuous process, or a combination thereof. A continuous process is preferred.

In an exemplary embodiment, the organic peroxide is added to the polypropylene prior to or during extrusion. The organic peroxide to be used in the process contemplated herein is solid at room temperature and may be added to the polypropylene as a water-based formulation (suspension), as a solution, as a dispersion in an inert solvent such as isododecane, in the form of flakes, as a powder, as a wet powder formulation, or as a masterbatch in a polymer or on an inert solid carrier (e.g. silica), optionally in combination with anti-oxidants and/or acid catchers (e.g. calcium stearate).

During extrusion, vacuum or atmospheric degassing may be applied in order to remove volatile decomposition products and any water introduced as part of the peroxide formulation.

The quantity of organic peroxide to be used will depend on the desired degree of modification and on the type of polypropylene employed. In an embodiment, use is made of organic peroxide concentrations in the range of about 0.1 to about 3.0 g of peroxide per 100 g polypropylene, for example, in the range of about 0.5 to about 2.0 g per 100 g polypropylene; all calculated as pure and dry organic peroxide.

Extrusion may be conducted in the presence of a co-agent in order to influence the melt flow index of the polypropylene and/or to enhance the degree of modification. Examples of coagents are TMAIC (trimethallyl isocyanurate), TAIC (triallyl isocyanurate), TAC (triallycyanurate), TRIM (trimethylol propane trimethacrylate), divinylbenzene, HVA-2 (N,N'-phenylene bismaleimide), AMSD (alpha methyl styrene dimer), and Perkalink 900 (1,3-bis(citraconimidomethyl)benzene).

A co-agent is generally understood to be a polyfunctional reactive additive such as a polyunsaturated compound which will react rapidly with polymer radicals, will overcome steric hindrance and minimize undesirable side reactions. The incorporation of an effective amount of one or more of these co-agents into the polypropylene, prior to or during the process contemplated herein tends to influence the melt flow index and molecular weight of the resulting polypropylene.

If so desired, conventional adjuvants, in an amount known to one skilled in the art, such as antioxidants, UV-stabilizers, lubricants, antidegradants, foaming agents, nucleating agents, fillers, pigments, acid catchers (e.g. calcium stearate), and/or antistatic agents may be added to the polypropylene. These adjuvants can be added to the polypropylene before as well as during or after extrusion. For example, a chemical blowing agent (e.g. azodicarbonamide) can be added or a physical blowing agent (e.g. a gas like nitrogen, carbon dioxide, butane, or isobutane) can be injected into an extruder in order to produce foamed polypropylene. A chemical blowing agent is preferably added before or after extrusion; a physical blowing agent is preferably injected during or after the extrusion.

In an exemplary embodiment, a stabilizer, e.g. one or more antioxidants, is added in order to deactivate any free radicals still present in the HMS-PP as well as any radicals which may be formed later from subsequent processing under air/oxygen. In a typical experiment, from about 0.01 to about 0.3, for example, about 0.01 to about 0.2 parts of one or more antioxidants per hundred parts of polypropylene (phr) are used.

The HMS-PP may be further processed as known to one of ordinary skill in the art. It may be formed directly into a desired end product, it may be processed using an underwater pelletizer, or it may be purified, modified, moulded, or blended with miscible amounts of other (polymer) materials, such as EPM, EPDM, and/or LDPE. Thus, there may be modifications using another polymer or monomer in order to enhance the end product's compatibility with other materials.

Alternatively, the HMS-PP may be degraded to increase its processability and/or applicability or may be further processed by, for example, foaming, foam moulding, injection moulding, blow moulding, extrusion coating, profile extrusion, cast film extrusion, blown film extrusion, and/or thermoforming.

EXAMPLES

The following examples illustrate the various embodiments, without limitation.

500 g of polypropylene homopolymer (PP) powder, different peroxide formulations, and 0.5 g (0.1 phr) Irganox® 1010 antioxidant, were mixed in a bucket with a spatula, and subsequently in a bucket mixer for 10 min.

The peroxide formulation was added in amounts corresponding to 10 g (2 phr) pure peroxide.

The following organic peroxides were used:
Dicetyl peroxydicarbonate (Perkadox® 24L; ex-AkzoNobel)
Dibenzoyl peroxide (Perkadox® L-W75, ex-AkzoNobel)
Di(para-methylbenzoyl) peroxide (Perkadox® PM-W75, ex-AkzoNobel)
Di(ortho-methylbenzoyl) peroxide (containing 25% water, ex-AkzoNobel)

The compounds were extruded on a Haake PolyLab OS RheoDrive 7 system fitted with a Haake Rheomex OS PTW16 extruder (co-rotating twin-screw, L/D=40), from Thermo Scientific, using the following settings:
Temperature profile settings: hopper at 30° C., zone 1 at 160° C., zones 2-4 at 190° C., zones 5-6 at 200° C., zones 7-10 at 210° C.
Screw speed: 280 rpm.
Throughput: 1.2 kg/h, dosed by a Brabender gravimetric screw feeder type DDW-MD2-DSR28-10.
Nitrogen was purged at the hopper (3.5 L/min) and the die (9 L/min).

The extruded material was led through a water bath for cooling and the cooled strands were granulated by an automatic granulator.

The melt-flow index (MFI), melt strength (MS), molecular weights and branching number of the extruded HMS-PP compounds were analysed as described below. The results are listed in Table 1.

Melt Flow Index

The melt flow index (MFI) was measured with a Goettfert Melt Indexer MI-3 according to ISO 1133 (230° C./2.16 kg load). The MFI is expressed in g/10 min.

Melt Strength

The melt strength (MS) was measured (in cN) with a Goettfert Rheograph 20 (capillary rheometer) in combination with a Goettfert Rheotens 71.97, according to the manufacturer's instructions using the following configuration and settings:
Rheograph:
 Temperature: 220° C.
 Melting time: 10 minutes
 Die: capillary, length 30 mm, diameter 2 mm
 Barrel chamber and piston: diameter 15 mm
 Piston speed: 0.32 mm/s, corresponding to a shear rate of 72 s$^{-1}$
 Melt strand speed (at start): 20 mm/s
Rheotens:
 Acceleration of wheels (strand): 10 mm/s$^2$
 Barrel to mid-wheel distance: 100 mm
 Strand length: 70 mm Molecular Weight and Branching Number The molecular weight of the polymer was determined with High Temperature Size Exclusion Chromatography (HT-SEC) at 150° C. The triple detection system was calibrated using polystyrene standard 96K (Polymer Laboratories, Mw/Mn=1.03) in 1,2,4-trichlorobenzene at 150° C.

Each sample was dissolved in trichlorobenzene, by heating at 150° C. under nitrogen atmosphere, for four hours.

A Malvern Viscotek HT-GPC system equipped with RI detector, LALS and RALS Light Scattering detector, and Viscometer was used.

Columns: A PL Gel Olexis Guard Column, 50×7.5 mm, 13 μm particle size, followed by three PL Gel Olexis 300×7.5 mm columns (13 μm particle size)
Mobile phase: 1,2,4-trichlorobenzene.
Flow: 1 ml/min
Sample concentration: 3 mg/ml
Temperature: 150° C.
Injection volume: 200 μl
Data processing: Omnisec™ v 5.10
Dn/dc for PP: 0.095

The molecular weights of the samples, i.e. the number-average (Mn), weight-average (Mw), and z-average (Mz) molecular weights, were calculated from Light Scattering (LS) detection.

From the Mark-Houwink plots, the branching numbers (Bn, i.e. the average number of branches per molecule) were calculated according to the theory of Zimm and Stockmayer, J. Chem. Phys. 17 (1949) 1301.

A blank polypropylene sample, —i.e. a polypropylene treated in the same manner, but in the absence of peroxide— was used as reference. For B$_n$ a calculation model of random, polydisperse, trifunctional branching was used with a structure factor ε of 0.75.

TABLE 1

| Organic peroxide | wt % (as pure peroxide) | Molecular weight properties | | | HMS-PP properties | | |
|---|---|---|---|---|---|---|---|
| | | $M_n$ (kg/mol) | $M_w$ (kg/mol) | $M_z$ (kg/mol) | MFI (g/10 min.) | MS (cN) | Bn |
| — (blank) | 0 | 83 | 279 | 596 | 6.4 | n.d. | 0.3 |
| dicetyl peroxy-dicarbonate | 1.5 | 97 | 365 | 961 | 2.8 | 10 | 1.1 |
| Dibenzoyl peroxide | 1.5 | n.d. | n.d. | n.d. | 4.5 | 7 | n.d. |
| Di(para-methylbenzoyl) peroxide | 1.5 | 100 | 444 | 1,371 | 2.1 | 17 | 2.5 |
| Di(para-methylbenzoyl) peroxide | 1.7 | 88 | 519 | 1,649 | 1.5 | 16 | 3.1 |
| Di(ortho-methylbenzoyl) peroxide | 1.7 | n.d. | n.d. | n.d. | 4.3 | 5 | n.d. | n.d. = not determined

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the various embodiments in any way. Rather, the foregoing detailed description will provide those skilled in the art with a convenient road map for implementing an exemplary embodiment as contemplated herein. It being understood that various changes may be made in the function and arrangement of elements described in an exemplary embodiment without departing from the scope of the various embodiments as set forth in the appended claims.

What is claimed is:

1. A process for enhancing the melt strength of polypropylene, the process comprising the steps of:
extruding a polypropylene homopolymer in a twin-screw extruder, under inert atmosphere comprising an oxygen concentration of below about 1 vol %, at a temperature in the range of from about 150° C. to about 300° C., and in the presence of about 0.1 to about 3.0 wt %, based on the weight of the polypropylene, an organic peroxide with the formula

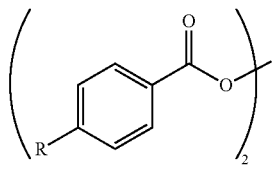

wherein each R is individually selected from $C_{1-5}$ alkyl groups.

2. The process according to claim 1, wherein the polypropylene is extruded in the presence of about 0.5 to about 2.0 wt % of said organic peroxide.

3. The process according to claim 1 wherein the organic peroxide is di(4-methylbenzoyl)peroxide.

4. The process according to claim 1, wherein the polypropylene is extruded at a temperature in the range of about from 155 to about 250° C.

5. The process according to claim 4 wherein the polypropylene is extruded at a temperature in the range of from about 160 to about 240° C.

6. The process according to claim 1, wherein the polypropylene is extruded under nitrogen atmosphere.

7. The process according to claim 1, wherein the polypropylene is extruded in the presence of from about 0.01 to about 0.3 phr one or more anti-oxidants.

8. The process according to claim 1, wherein the organic peroxide is added to the polypropylene prior to or during extruding.

9. The process according to claim 1, wherein each R of the organic peroxide is individually selected from C1-5 alkyl groups.

10. The process according to claim 1, wherein a co-agent is added to the polypropylene prior to or during extruding.

11. The process according to claim 10, wherein the co-agent is selected from TMAIC (trimethallyl isocyanurate), TAIC (triallyl isocyanurate), TAC (triallycyanurate), TRIM (trimethylol propane trimethacrylate), divinylbenzene, HVA-2 (N,N'-phenylene bismaleimide), AMSD (alpha methyl styrene dimer), and 1,3-bis(citraconimidomethyl) benzene.

12. A process for enhancing the melt strength of polypropylene, the process comprising the steps of:
extruding a polypropylene homopolymer in a twin-screw extruder, under inert atmosphere comprising an oxygen concentration of below about 1 vol %, at a temperature of from about 160° C. to about 210° C., and in the presence of about 1.5 to about 1.7 wt %, of di(para-methylbenzoyl) peroxide based on the weight of the polypropylene to form a polypropylene having a melt strength of 16 to 17 cN measured using a Goettfert Rheograph 20 capillary rheometer in combination with a Goettfert Rheotens 71.97.

13. The process according to claim 12, wherein the polypropylene is extruded under nitrogen atmosphere.

14. The process according to claim 12, wherein the polypropylene is extruded in the presence of about 0.1 phr of pentaerythritol tetrakis(3-(3,5-di-tert-butyl-4-hydroxyphenyl)propionate).

15. The process according to claim 12, wherein the di(para-methylbenzoyl) peroxide is added to the polypropylene prior to or during extruding.

16. The process according to claim 12, wherein a co-agent is added to the polypropylene prior to or during extruding.

17. The process according to claim 16, wherein the co-agent is selected from TMAIC (trimethallyl isocyanurate), TAIC (triallyl isocyanurate), TAC (triallycyanurate), TRIM (trimethylol propane trimethacrylate), divinylbenzene, HVA-2 (N,N'-phenylene bismaleimide), AMSD (alpha methyl styrene dimer), and 1,3-bis(citraconimidomethyl) benzene.

18. A process for enhancing the melt strength of polypropylene, the process comprising the steps of:
extruding a polypropylene homopolymer in a twin-screw extruder, under inert atmosphere comprising an oxygen concentration of below about 1 vol %, at a temperature in the range of from about 155° C. to about 250° C, and in the presence of about 0.5 to about 2.0 wt %, based on the weight of the polypropylene, di(4-methylbenzoyl)peroxide.

19. The process according to claim 18, wherein
the polypropylene is extruded under nitrogen atmosphere;
the polypropylene is extruded in the presence of from about 0.01 to about 0.3 phr one or more antioxidants;
the di(4-methylbenzoyl)peroxide is added to the polypropylene prior to or during extruding; and
a co-agent is added to the polypropylene prior to or during extruding.

20. The process according to claim 19, wherein the co-agent is selected from TMAIC (trimethallyl isocyanurate), TAIC (triallyl isocyanurate), TAC (triallycyanurate), TRIM (trimethylol propane trimethacrylate), divinylbenzene, HVA-2 (N,N'-phenylene bismaleimide), AMSD (alpha methyl styrene dimer), and 1,3-bis(citraconimidomethyl)benzene.

* * * * *